(12) United States Patent
Matsuura

(10) Patent No.: US 11,536,562 B2
(45) Date of Patent: Dec. 27, 2022

(54) ANALYSIS APPARATUS, ANALYSIS METHOD, AND INTERFERENCE MEASUREMENT SYSTEM

(71) Applicant: Mitutoyo Corporation, Kanagawa (JP)

(72) Inventor: Shimpei Matsuura, Eindhoven (NL)

(73) Assignee: Mitutoyo Corp., Kanagawa (JP)

( * ) Notice: Subject to any disclaimer, the term of this patent is extended or adjusted under 35 U.S.C. 154(b) by 280 days.

(21) Appl. No.: 17/032,733

(22) Filed: Sep. 25, 2020

(65) Prior Publication Data

US 2021/0102802 A1 Apr. 8, 2021

(30) Foreign Application Priority Data

Oct. 8, 2019 (JP) .............................. JP2019-185329

(51) Int. Cl.
| | |
|---|---|
| *G01B 11/30* | (2006.01) |
| *G01B 9/02* | (2022.01) |
| *G01B 9/02055* | (2022.01) |
| *G01B 9/02056* | (2022.01) |
| *G01B 11/24* | (2006.01) |

(52) U.S. Cl.
CPC .......... *G01B 11/303* (2013.01); *G01B 9/0207* (2013.01); *G01B 9/02057* (2013.01); *G01B 9/02075* (2013.01); *G01B 9/02083* (2013.01); *G01B 11/2441* (2013.01)

(58) Field of Classification Search
CPC .............. G01B 9/02057; G01B 9/0207; G01B 9/02075; G01B 9/02083; G01B 11/2441
See application file for complete search history.

(56) References Cited

U.S. PATENT DOCUMENTS

| | | | |
|---|---|---|---|
| 7,796,273 B2 | 9/2010 | Deck | |
| 7,796,275 B2 | 9/2010 | Deck | |
| 7,948,639 B2 | 5/2011 | Deck | |
| 2005/0237534 A1* | 10/2005 | Deck .................. | G01B 9/02084 356/497 |

(Continued)

FOREIGN PATENT DOCUMENTS

| | | | | |
|---|---|---|---|---|
| DE | 102013217216 A1 * | 3/2015 | ........... | G01D 5/2449 |
| JP | 2017-020962 | 1/2017 | | |

OTHER PUBLICATIONS

D. Malacara, "Optical Shop Testing 3rd ed.", Wiley-Interscience, 2007, Discussed in specification, 46 pages.

*Primary Examiner* — Michael A Lyons
(74) *Attorney, Agent, or Firm* — Rankin, Hill & Clark LLP

(57) ABSTRACT

An analysis apparatus includes an acquisition part that acquires a plurality of interference images of the object to be measured from the interference measurement apparatus, a calculation part that calculates a sine wave component and a cosine wave component of an interference signal for each pixel in the plurality of interference images, respectively, an error detection part that detects an error between a first Lissajous figure constructed on the basis of the sine wave component and the cosine wave component for each pixel and an ideal second Lissajous figure, a correction part that corrects the sine wave component and the cosine wave component for each pixel on the basis of the error, and a geometry calculation part that calculates surface geometry of the object to be measured on the basis of the corrected sine wave component and cosine wave component.

8 Claims, 4 Drawing Sheets

(56) References Cited

U.S. PATENT DOCUMENTS

| | | | |
|---|---|---|---|
| 2009/0116034 A1* | 5/2009 | Takahashi | G01B 9/02081 |
| | | | 356/498 |
| 2014/0152998 A1* | 6/2014 | Okuda | G01B 9/0207 |
| | | | 356/498 |
| 2017/0016711 A1 | 1/2017 | Kawasaki et al. | |
| 2019/0265019 A1* | 8/2019 | Jansen | G01B 9/02059 |
| 2021/0102800 A1* | 4/2021 | Matsuura | G01B 9/02083 |

* cited by examiner

ANALYSIS APPARATUS, ANALYSIS METHOD, AND INTERFERENCE MEASUREMENT SYSTEM

CROSS-REFERENCE TO RELATED APPLICATIONS

The present application claims priority to Japanese Patent Applications number 2019-185329, filed on Oct. 8, 2019. The contents of this application are incorporated herein by reference in their entirety.

BACKGROUND OF THE INVENTION

Inspection of surface geometry of a semiconductor wafer, a high-precision mirror, and the like may require high precision, and a Fizeau laser interferometer, a Twyman-Green interferometer, or the like is used for such inspection. Such an interferometer measures surface geometry of an object to be measured by analyzing a plurality of interference images acquired by changing a phase difference between measurement light reflected at a surface of the object to be measured and reference light. As techniques for changing the phase difference between the reference light and the measurement light, a mechanical method in which an optical element is mechanically moved, a polarization method using polarized light, and the like have been known (see Patent Documents 1: U.S. Pat. No. 7,796,273, Patent Document 2: U.S. Pat. No. 7,796,275, Patent Document 3: U.S. Pat. No. 7,948,639, Patent Document 4: Japanese Unexamined Patent Application Publication No. 2017-20962, and Non-Patent Document 1: D. Malacara, "Optical Shop Testing 3rd ed.", Wiley-Interscience, 2007).

Conventionally, an amount of change in the phase difference between the reference light and the measurement light has been sometimes treated as a known parameter when analyzing a plurality of interference images generated by a laser interferometer. However, a phase shift amount of a phase shifter for changing the phase difference may include an error due to, for example, an operating error of a piezoelectric element, an imperfection of an optical element, and the like. Further, since the phase shift amount is disturbed by external factors such as vibration and air fluctuation, it has been difficult to realize an ideal phase shift by the phase shifter. Because the error from the ideal phase shift affects the analysis result of the interference image of the laser interferometer, it has been desired to conveniently reduce the influence of such a phase shift error.

BRIEF SUMMARY OF THE INVENTION

The present invention focuses on these points, and an object of the present invention is to conveniently reduce the influence of the phase shift error when analyzing the interference image of the laser interferometer.

The first aspect of the present invention provides an analysis apparatus for analyzing an interference image of an interference measurement apparatus for generating the interference image of reference light and measurement light reflected by irradiating a reference surface and a surface of an object to be measured with a laser light, the analysis apparatus includes an acquisition part that acquires a plurality of the interference images based on a plurality of optical path lengths between the reference surface and the surface of the object to be measured from the interference measurement apparatus, a calculation part that calculates a sine wave component and a cosine wave component of an interference signal for each pixel in the plurality of the interference images, respectively, an error detection part that detects an error between a first Lissajous figure constructed on the basis of the sine wave component and the cosine wave component for each pixel and an ideal second Lissajous figure, a correction part that corrects the sine wave component and the cosine wave component for each pixel on the basis of the error, and a geometry calculation part that calculates surface geometry of the object to be measured on the basis of the corrected sine wave component and cosine wave component.

The second aspect of the present invention provides an analysis method for analyzing an interference image of an interference measurement apparatus for generating the interference image of reference light and measurement light reflected by irradiating a reference surface and a surface of an object to be measured with a laser light, the analysis method including the steps of acquiring a plurality of the interference images based on a plurality of optical path lengths between the reference surface and the surface of the object to be measured from the interference measurement apparatus, calculating a sine wave component and a cosine wave component of an interference signal for each pixel in the plurality of the interference images, respectively, detecting an error between a first Lissajous figure constructed on the basis of the sine wave component and the cosine wave component for each pixel and an ideal second Lissajous figure, correcting the sine wave component and the cosine wave component for each pixel on the basis of the error, and calculating surface geometry of the object to be measured on the basis of the corrected sine wave component and cosine wave component.

The third aspect of the present invention provides an interference measurement system including an interference measurement apparatus, and the analysis apparatus according to the first aspect that analyzes the plurality of the interference images captured by the interference measurement apparatus, wherein the interference measurement apparatus includes a light source part that irradiates the surface of the object to be measured with a laser light, the reference surface that is movably provided on an optical axis of the laser light, and an image capturing part that captures the interference image of reference light reflected at the reference surface and measurement light reflected at the surface of the object to be measured.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

<Configuration Example of Interference Measurement System 1000>

Figure 1:
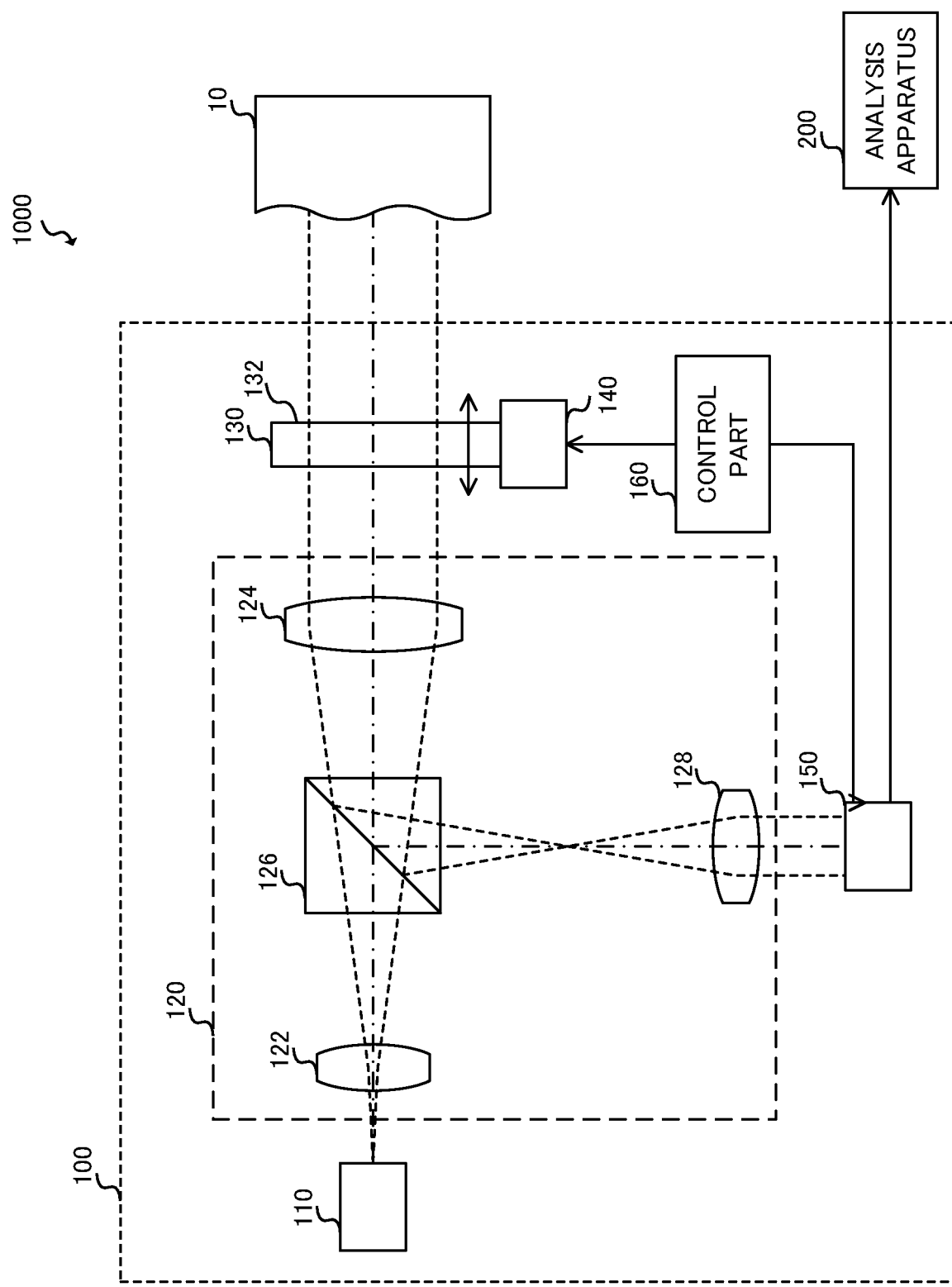
FIG. 1 shows a configuration example of an interference measurement system 1000 according to the present embodiment together with an object to be measured 10.

FIG. 1 shows a configuration example of an interference measurement system 1000 according to the present embodiment together with an object to be measured 10. The interference measurement system 1000 constitutes a Fizeau interferometer and measures surface geometry of the object to be measured 10. The object to be measured 10 is, for example, a solid body such as a semiconductor wafer including Si, GaAs, GaN, or the like, a high-precision mirror, and a metal. The interference measurement system 1000 is provided with an interference measurement apparatus 100 and an analysis apparatus 200. The interference measurement apparatus 100 includes a light source part 110, an optical system 120, a reference object 130, a phase shifter 140, an image capturing part 150, and a control part 160.

The light source part 110 includes a laser and irradiates a surface of the object to be measured 10 with a laser light. The light source part 110 outputs, for example, a laser light having a predetermined wavelength. The light source part 110 is a He—Ne laser, as an example.

The optical system 120 irradiates the object to be measured 10 and the reference object 130 with the laser light outputted from the light source part 110. Further, the optical system 120 forms an image of reflected light from the object to be measured 10 and the reference object 130 on the image capturing part 150. The optical system 120 includes a magnifying lens 122, a collimating lens 124, a beam splitter 126, and an image forming lens 128.

The magnifying lens 122 enlarges a diameter of the laser light outputted from the light source part 110. The collimating lens 124 collimates the light entering from the magnifying lens 122 and irradiates the surface of the object to be measured 10 with the collimated light. Further, the light reflected by the surface of the object to be measured 10 enters the collimating lens 124, and the collimating lens 124 emits the reflected light to the beam splitter 126 while reducing the diameter thereof. Here, the light reflected by the surface of the object to be measured 10 is referred to as measurement light.

The reference object 130 is provided between the collimating lens 124 and the object to be measured 10, and a portion of the collimated light emitted from the collimating lens 124 is reflected by a reference surface 132 of the reference object 130. Thus, the collimating lens 124 emits the measurement light and the light reflected by the reference surface 132 to the beam splitter 126. Here, the light reflected by the reference surface 132 is referred to as reference light.

The beam splitter 126 reflects portions of the measurement light and the reference light emitted from the collimating lens 124 toward the image capturing part 150. The beam splitter 126 includes, for example, a half mirror. The image forming lens 128 forms an image of the light reflected by the beam splitter 126 on the image capturing part 150. The image forming lens 128 forms an interference image, in which the measurement light and the reference light interfere with each other, on the image capturing part 150.

The reference object 130 includes the reference surface 132, as described above. The reference object 130 is, for example, a half mirror having the reference surface 132 as a mirror surface. The reference surface 132 is provided substantially perpendicular to an optical axis of the laser light outputted from the light source part 110. Further, the reference surface 132 is movably provided on the optical axis of the laser light.

The phase shifter 140 moves the reference object 130 such that the reference surface 132 moves in the optical axis direction of the laser light. The distance between the reference surface 132 and the surface of the object to be measured 10 changes by moving the reference surface 132 in the optical axis direction of the laser light, such that the phase difference between the measurement light and the reference light shifts. The phase shifter 140 moves the reference object 130 until the phase difference between the measurement light and the reference light becomes, for example, about a or more. The phase shifter 140 includes, for example, a piezoelectric element or the like, and moves the reference object 130 by a distance in accordance with an inputted control signal.

The image capturing part 150 captures the interference image of the reference light reflected by the reference surface 132 and the measurement light reflected by the surface of the object to be measured 10. The image capturing part 150 includes, for example, a camera or the like, and captures the interference image formed by the optical system 120 in response to the control signal.

The control part 160 controls the phase shifter 140 and the image capturing part 150 to capture a plurality of interference images based on a plurality of optical path lengths between the reference surface 132 and the surface of the object to be measured 10. The control part 160, for example, transmits the control signal to the phase shifter 140 to control the phase shifter 140 so as to move the reference object 130 to a predetermined position. Further, the control part 160 transmits the control signal to the image capturing part 150 to control the image capturing part 150 so as to capture the interference image. For example, the control part 160 controls the phase shifter 140 and the image capturing part 150 to move the reference surface 132 by a distance corresponding to a predetermined phase shift amount, and capture the interference image each time the reference surface 132 moves. The control part 160 includes, for example, a Central Processing Unit (CPU) and the like.

In this manner, the interference measurement apparatus 100 irradiates the reference surface 132 and the surface of the object to be measured 10 with the laser light to produce the interference image of the reflected reference light and measurement light. The interference measurement apparatus 100 having the optical system 120 shown in FIG. 1 is known as the Fizeau interferometer, and can measure geometry of an irregularity on the surface of the object to be measured 10 with accuracy on the order of nanometers.

For such highly accurate measurement, the phase difference between the measurement light and the reference light must be precisely controlled. However, the phase shift amount of the phase shifter 140 may include an error due to an operating error of a piezoelectric element or the like for moving the reference object 130, an imperfection of the optical system 120, and the like. Further, an environmental change of the interference measurement apparatus 100 due to vibration, temperature, air fluctuation, and the like may cause an error in the phase shift amount of the phase shifter 140, and it has been difficult to ideally control the phase shift amount.

Conventionally, an influence on a measurement accuracy based on such an error in the phase shift amount has been reduced by, for example, a frequency filtering process using a window function, a process of correcting the error in the interference image by modeling the influence of the error, or the like. However, because such process uses a numerical process using at least tens of interference images, an iterative process using a plurality of parameters, or the like, the process has a high calculation cost and may end with a local solution, such that the interference measurement could not be conveniently performed.

Therefore, the analysis apparatus 200 according to the present embodiment can easily perform a high-precision interference measurement by analyzing ten or fewer interference images generated by the interference measurement apparatus 100. The analysis apparatus 200 will be described below.

<Configuration Example of the Analysis Apparatus 200>

Figure 2:
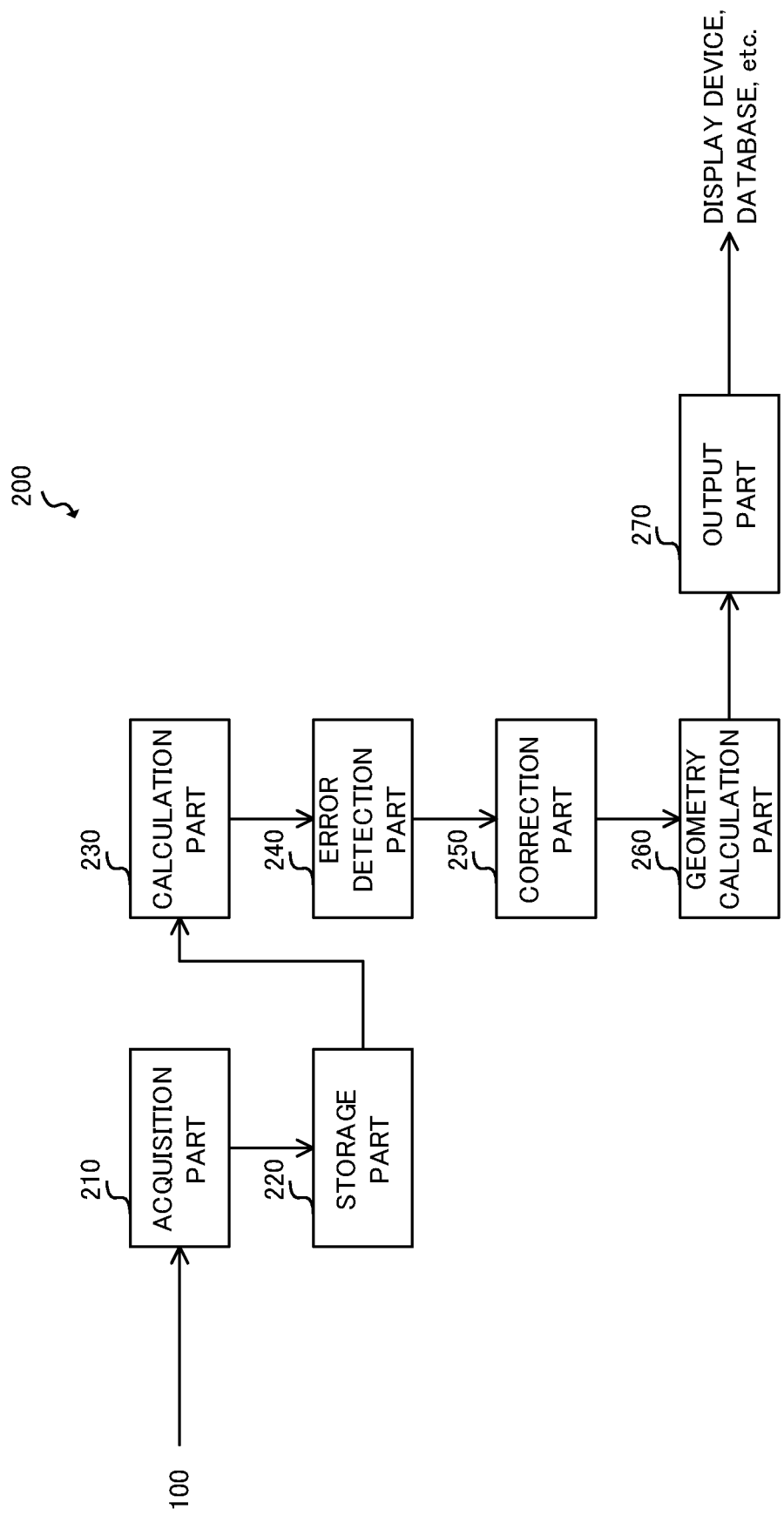
FIG. 2 shows a configuration example of an analysis apparatus 200 according to the present embodiment.

FIG. 2 shows a configuration example of the analysis apparatus 200 according to the present embodiment. The analysis apparatus 200 is, for example, a computer such as a server. It should be noted that the analysis apparatus 200 may execute at least a part of the operation of the control part 160 of the interference measurement apparatus 100. The analysis apparatus 200 includes an acquisition part 210, a storage part 220, a calculation part 230, an error detection part 240, a correction part 250, a geometry calculation part 260, and an output part 270.

The acquisition part 210 acquires, from the interference measurement apparatus 100, the plurality of interference images based on the plurality of optical path lengths between the reference surface 132 and the surface of the object to be measured 10. The acquisition part 210 may acquire the interference image by being connected to the image capturing part 150 of the interference measurement apparatus 100, and alternatively may acquire the interference image via a network or the like. Further, the acquisition part 210 may acquire the plurality of interference images from an external database or the like. In this instance, the acquisition part 210 acquires, for example, the interference image previously generated by the interference measurement apparatus 100.

The storage part 220 stores image data of the interference image acquired by the acquisition part 210. The storage part 220 preferably stores the image data of the plurality of interference images in association with the phase difference of the measurement light and the reference light, or the order of the interference measurements. Further, the storage part 220 may store intermediate data, a calculation result, a threshold, a parameter, and the like, which are generated (or used) by the analysis apparatus 200 in a process of the operation. Furthermore, the storage part 220 may provide, in response to a request from each part in the analysis apparatus 200, the stored data to a requester.

The storage part 220 may store an Operating System (OS) for a server or the like to function as the analysis apparatus 200, and information of a program. Further, the storage part 220 may store various types of information including a database that is referred to when the program is executed. For example, the computer such as the server functions as at least a part of the acquisition part 210, the storage part 220, the calculation part 230, the error detection part 240, the correction part 250, the geometry calculation part 260, and the output part 270 by executing the program stored in the storage part 220.

The storage part 220 includes, for example, a Read Only Memory (ROM) for storing a Basic Input Output System (BIOS) of the computer or the like, and a Random Access Memory (RAM) as a work area. Further, the storage part 220 may also include a mass storage device such as a Hard Disk Drive (HDD) and/or a Solid State Drive (SSD). Furthermore, the computer may further include a Graphics Processing Unit (GPU) or the like.

The calculation part 230 calculates a sine wave component and a cosine wave component of an interference signal for each pixel in the plurality of interference images, respectively. The calculation part 230 generates the interference signal for each pixel from the plurality of interference images. For example, if the interference image is image data of N×M pixels, the calculation part 230 generates N×M interference signals. Then, the calculation part 230 calculates, for each interference signal, the sine wave component and the cosine wave component corresponding to the frequency of the laser light.

The error detection part 240 makes a Lissajous figure based on the sine wave component and the cosine wave component calculated for each pixel, and detects an error corresponding to the error in the phase shift amount. The correction part 250 corrects the sine wave component and the cosine wave component for each pixel on the basis of the detected error. The geometry calculation part 260 calculates the surface geometry of the object to be measured 10 on the basis of the corrected sine wave component and cosine wave component. A detection of the error, a correction of the error, and a calculation of the surface geometry of the object to be measured 10 will be described later.

The output part 270 outputs the calculation result of the surface geometry to a display device or the like. The output part 270 may display numerical data, and alternatively or additionally, may schematically display the surface geometry of the object to be measured 10. Further, the output part 270 may store the calculation result of the surface geometry of the object to be measured 10 in the external database or the like.

The analysis apparatus 200 according to the present embodiment described above generates the interference signal for each pixel from the plurality of interference images, thereby detecting and correcting the error in the phase shift amount corresponding to each pixel without an iterative calculation using a plurality of parameters. A more specific operation of the analysis apparatus 200 will be described below.

<Operation Flow of the Analysis Apparatus 200>

Figure 3:
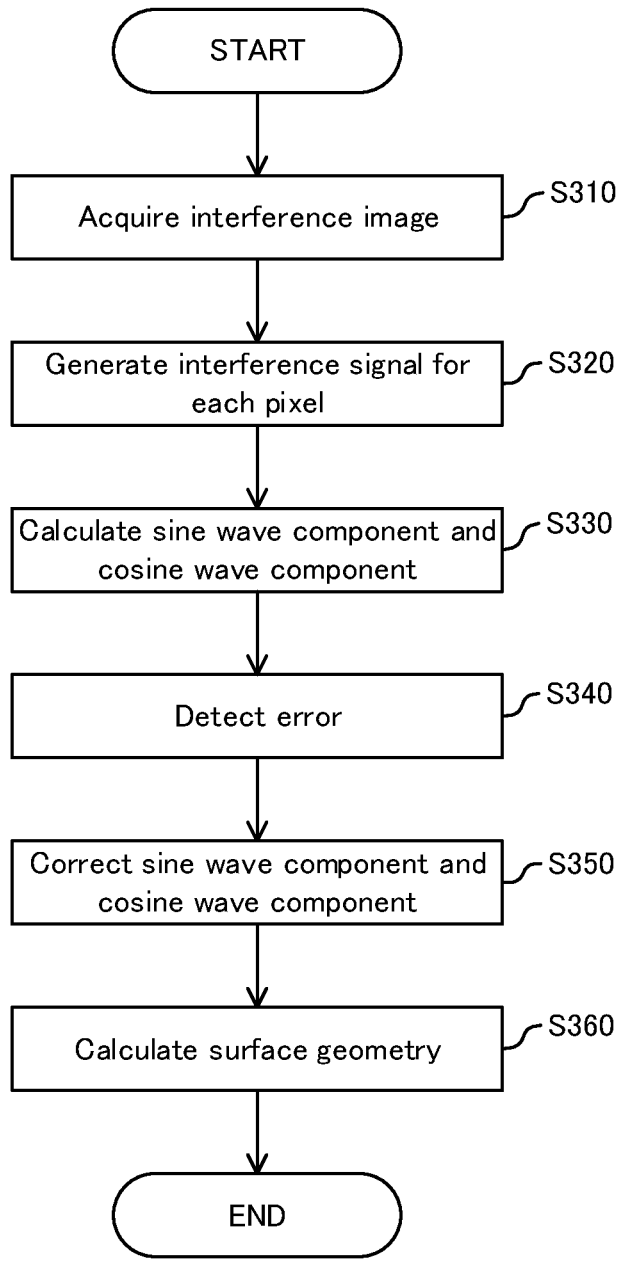
FIG. 3 shows an example of an operation flow of the analysis apparatus 200 according to the present embodiment.

FIG. 3 shows an example of an operation flow of the analysis apparatus 200 according to the present embodiment. The analysis apparatus 200 calculates and outputs the surface geometry of the object to be measured 10, in which the phase shift error is corrected from the plurality of interference images, by executing the operations from step S310 to step S360 in FIG. 3.

First, the acquisition part 210 acquires the plurality of interference images from the interference measurement apparatus 100 (step S310). In the present embodiment, an example in which the acquisition part 210 acquires K interference images from the interference measurement apparatus 100 will be described. Here, the interference image is assumed to be image data of N×M pixels, and the image data of the interference image acquired by the acquisition part 210 is referred to as $I_i(x_n, y_m)$. Here, i=1, 2, 3, . . . , K, n=1, 2, 3, . . . , N, and m=1, 2, 3, . . . , M.

Next, the calculation part 230 generates the interference signal for each pixel from the plurality of interference images (step S320). For example, the calculation part 230 generates N×M interference signals $S(i)_{n,m}$ according to the following equation. Each interference signal will contain K pieces of data.

$$S(i)_{n,m} = I_i(x_n, y_m)$$ [Equation 1]

Next, the calculation part 230 calculates the sine wave component and the cosine wave component corresponding to the frequency of the laser light included in the interference signal $S(i)_{n,m}$ (step S330). The calculation part 230 calculates a sine wave component $I_{sin}(x_n, y_m)$ and a cosine wave component $I_{cos}(x_n, y_m)$, for example, according to the following equation.

$$I_{sin}(x_n, y_m) = \frac{\sum_{i=1}^{K} I_i(x_n, y_m) \sin \delta_i}{\gamma(x_n, y_m)}$$

$$I_{cos}(x_n, y_m) = \frac{\sum_{i=1}^{K} I_i(x_n, y_m) \cos \delta_i}{\gamma(x_n, y_m)}$$ [Equation 2]

$$\gamma(x_n, y_m) = \sum_{i=1}^{K} I_i(x_n, y_m)$$

Here, $\delta_i$ is a phase shift amount shifted by the phase shifter 140 when the interference measurement apparatus 100 generates the i-th interference image. $\delta_i$ is a value corresponding to the phase shift amount controlled by the control part 160, and is treated as a known parameter in calculations. However, $\delta_i$ includes an error as described above. Further, $\gamma$ is a coefficient for normalizing the light amount distribution for each pixel.

The error detection part 240 then constructs the first Lissajous figure on the basis of the sine wave component and the cosine wave component for each pixel and detects the error between the first Lissajous figure and an ideal second Lissajous figure (step S340). The first Lissajous figure is a figure in which $u = I_{cos}(x_n, y_m)$ and $v = I_{sin}(x_n, y_m)$ are plotted on a uv plane. When an ideal interference measurement in which the error is not superimposed on $\delta_i$ is executed, the Lissajous figure will be a circle having a radius $r = (u^2 + v^2)^{1/2}$. Here, the error detection part 240 uses an ideal Lissajous figure, which is a circle having a predetermined radius, as the second Lissajous figure.

Figure 4:
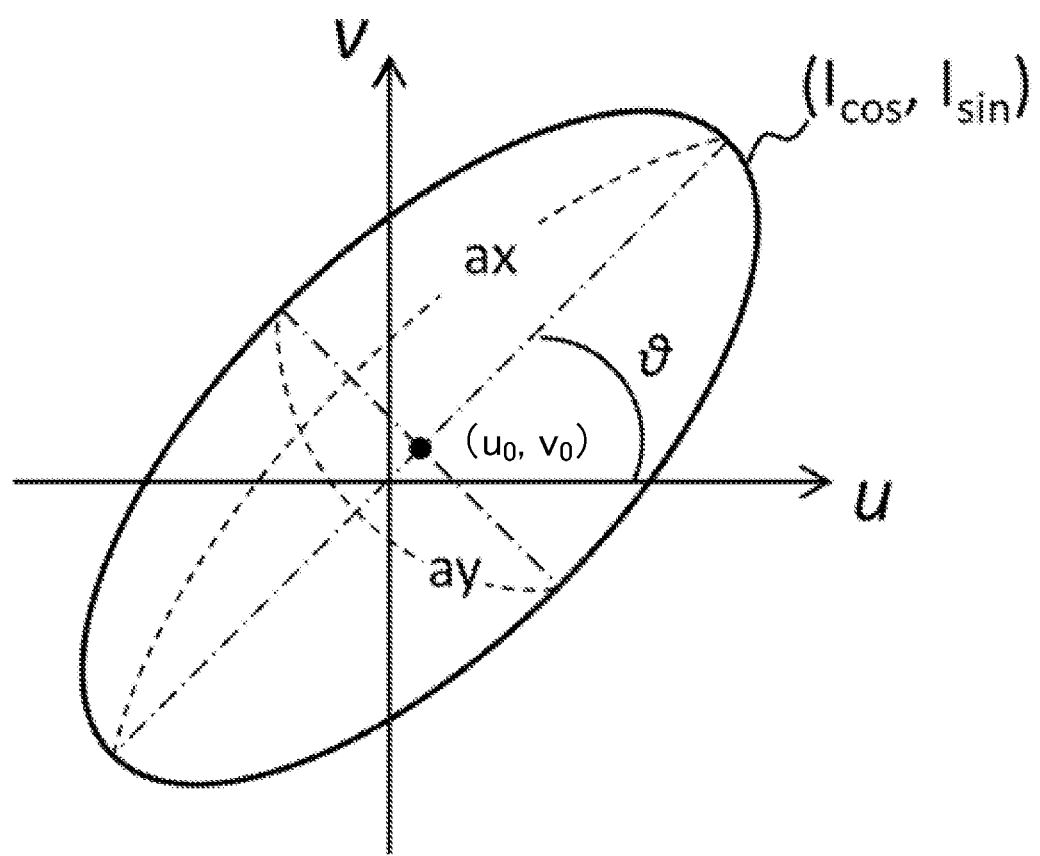
FIG. 4 shows an example of a first Lissajous figure constructed by an error detection part 240 according to the present embodiment.

FIG. 4 shows an example of the first Lissajous figure constructed by the error detection part 240 according to the present embodiment. FIG. 4 shows an example of the first Lissajous figure, in which $u = I_{cos}(x_n, y_m)$ and $v = I_{sin}(x_n, y_m)$ are plotted with the horizontal axis as a u-axis and the vertical axis as a v-axis. The first Lissajous figure is an ellipse, as shown in FIG. 4, if the error is superimposed on $\delta_i$.

The error detection part 240 extracts information of the first Lissajous figure having an elliptical shape constructed in this way. The error detection part 240 extracts the parameter of the ellipse as the information of the first Lissajous figure by, for example, fitting the first Lissajous figure to the ellipse by using the least-squares method or the like. In this instance, the information of the first Lissajous figure includes center coordinates $(u_0, v_0)$, a major axis $a_x$, a minor axis $a_y$, and an angle $\theta$ of the axis of the ellipse, as an example. As described above, if the error detection part 240 plots the elliptical shape as the first Lissajous figure, the difference between the elliptical shape and the circular shape, which is the second Lissajous figure, is an error corresponding to the error of the phase shift amount.

Then, the correction part 250 corrects the sine wave component and the cosine wave component for each pixel on the basis of the detected error (step S350). The correction part 250 corrects the first Lissajous figure to approach the second Lissajous figure by correcting the center coordinates and an ellipticity of the first Lissajous figure based on the sine wave component and the cosine wave component for each pixel. The correction part 250 corrects the sine wave component and the cosine wave component according to the following equation, for example, to shift the center coordinates to the origin. Here, $I_{sin}'(x_n, y_m)$ and $I_{cos}'(x_n, y_m)$ are the sine wave component and the cosine wave component after the correction of the center coordinates.

$$I_{sin}'(x_n, y_m) = I_{sin}(x_n, y_m) - v_0$$

$$I_{cos}'(x_n, y_m) = I_{cos}(x_n, y_m) - u_0$$ [Equation 3]

Further, the correction part 250 corrects the ellipticity by correcting the sine wave component and the cosine wave component. The correction part 250 rotates the ellipse by $-\theta$ such that the angle $\theta$ becomes 0, and then corrects amplitude values of the sine wave component and the cosine wave component such that the length of the major axis coincides with the length of the minor axis, and returns the angle to $\theta$, for example. The correction part 250 corrects $I_{sin}'(x_n, y_m)$ and $I_{cos}'(x_n, y_m)$ according to the following equation, as an example. Here, $I_{sin}''(x_n, y_m)$ and $I_{cos}''(x_n, y_m)$ are the sine wave component and the cosine wave component after the correction of the center coordinates. Further, $R(\theta)$ is a rotation matrix.

$$\begin{bmatrix} I_{sin}''(x_n, y_m) \\ I_{cos}''(x_n, y_m) \end{bmatrix} = R(\theta) \begin{bmatrix} a_y/a_x & \\ & 1 \end{bmatrix} R(-\theta) \begin{bmatrix} I_{sin}'(x_n, y_m) \\ I_{cos}'(x_n, y_m) \end{bmatrix}$$ [Equation 4]

Next, the geometry calculation part 260 calculates the surface geometry of the object to be measured 10 on the basis of the corrected sine wave component $I_{sin}''(x_n, y_m)$ and the cosine wave component $I_{cos}''(x_n, y_m)$ (step S360). The geometry calculation part 260 calculates, for example, a phase difference $\varphi_{nm}$ from a reference height at a position $(x_n, y_m)$ on the surface of the object to be measured 10 corresponding to a pixel $(x_n, y_m)$ of the interference image, according to the following equation.

$$\varphi_{n,m} = \tan^{-1} \frac{-I_{sin}''(x_n, y_m)}{I_{cos}''(x_n, y_m)}$$ [Equation 5]

The geometry calculation part 260 calculates, on the basis of the phase difference $\varphi_{nm}$, the height $h_{nm}$ at the position $(x_n, y_m)$ on the surface of the object to be measured 10, according to the following equation. Here, $\lambda$ is a wavelength of the laser light of the light source part 110.

$$h_{n,m} = \frac{\lambda}{4\pi} \varphi_{n,m}$$ [Equation 6]

As described above, the analysis apparatus 200 according to the present embodiment can calculate the surface geometry of the object to be measured 10 by correcting the phase shift error of the phase shifter 140. The analysis apparatus 200 detects and corrects the phase shift error on the basis of the sine wave component and the cosine wave component included in the interference signal for each pixel in the interference image generated by the interference measurement apparatus 100. Here, the sine wave component and the cosine wave component of the interference signal can be sufficiently calculated even if there are about ten or fewer measurement points. That is, the analysis apparatus 200 can detect and correct the phase shift error on the basis of about ten or fewer interference images.

Further, the analysis apparatus 200 can detect and correct the phase shift error without using the iterative process or the like using the plurality of parameters. Therefore, the analysis apparatus 200 can reduce the computational cost and conveniently perform the high-precision interference measurement.

It should be noted that an example in which the analysis apparatus 200 according to the present embodiment analyzes the interference image generated by the interference measurement apparatus 100 including the Fizeau interferometer is described, but the present invention is not limited thereto. The analysis apparatus 200 can analyze the interference image even with the interference measurement apparatus 100 including other types of interferometers, as long as it is an interferometer that generates phase shift errors. For example, the interference measurement apparatus 100 may include a Twyman-Green interferometer. Further, the interference measurement apparatus 100 is not limited to an apparatus including an interferometer that moves the reference surface 132 to shift the phase, and may include an interferometer that shifts a polarization phase of the laser light.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. An interference measurement system comprising an interference measurement apparatus and an analysis apparatus, wherein:
    the interference measurement apparatus includes:
    a light source part that irradiates a surface of an object to be measured with a laser light;
    a reference surface that is movably provided on an optical axis of the laser light;
    an image capturing part that captures an interference image of reference light reflected at the reference surface and measurement light reflected at the surface of the object to be measured, and wherein
    the analysis apparatus includes:
    an acquisition part that acquires a plurality of the interference images based on a plurality of optical path lengths between the reference surface and the surface of the object to be measured from the interference measurement apparatus;
    a calculation part that calculates a sine wave component and a cosine wave component of an interference signal for each pixel in the plurality of the interference images, respectively;
    an error detection part that detects an error between a first Lissajous figure constructed on the basis of the sine wave component and the cosine wave component for each pixel and an ideal second Lissajous figure;
    a correction part that corrects the sine wave component and the cosine wave component for each pixel on the basis of the error; and
    a geometry calculation part that calculates surface geometry of the object to be measured on the basis of the corrected sine wave component and cosine wave component.

2. The interference measurement system according to claim 1, wherein
    the error detection part uses a circle having a predetermined radius as the second Lissajous figure, and
    the correction part corrects the first Lissajous figure to approach the second Lissajous figure by correcting center coordinates and an ellipticity of the first Lissajous figure based on the sine wave component and the cosine wave component for each pixel.

3. The interference measurement system according to claim 1, wherein
    the error detection part extracts information of the first Lissajous figure having an elliptical shape from the sine wave component and the cosine wave component of an interference signal for each pixel in the plurality of the interference images.

4. The interference measurement system according to claim 1, wherein
    the calculation part calculates the sine wave component as $I_{sin}(x_n, y_m)$ and the cosine wave component as $I_{cos}(x_n, y_m)$, according to the following equation, $$I_{sin}(x_n, y_m) = \frac{\sum_{i=1}^{K} I_i(x_n, y_m)\sin\delta_i}{\gamma(x_n, y_m)}$$ [Equation 1]

$$I_{cos}(x_n, y_m) = \frac{\sum_{i=1}^{K} I_i(x_n, y_m)\cos\delta_i}{\gamma(x_n, y_m)}$$

$$\gamma(x_n, y_m) = \sum_{i=1}^{K} I_i(x_n, y_m)$$

where $I_i(x_n, y_m)$ shows image data of N×M pixels of K interference images, where i=1, 2, 3, . . . , K, n=1, 2, 3, . . . , N, and m=1, 2, 3, . . . , M, and $\delta_i$ is a phase shift amount corresponding to an optical path length between the reference surface and the surface of the object to be measured when i-th interference image is generated.

5. The interference measurement system according to claim 4, wherein
    the error detection part extracts information of the first Lissajous figure having an elliptical shape including the center coordinates $(u_0, v_0)$, a major axis $a_x$, a minor axis $a_y$, and an angle $\theta$ of an axis of the ellipse from the first Lissajous figure, in which $u=I_{cos}(x_n, y_m)$ and $v=I_{sin}(x_n, y_m)$ are plotted with the horizontal axis as a u-axis and the vertical axis as a v-axis, and
    the correction part corrects the sine wave component and the cosine wave component using the following equation such that the first Lissajous figure approaches the second Lissajous figure whose center coordinates are the origin $$I_{sin}'(x_n,y_m)=I_{sin}(x_n,y_m)-v_0$$

$$I_{cos}'(x_n,y_m)=I_{cos}(x_n,y_m)-u_0 \quad \text{[Equation 2]}.$$

6. The interference measurement system according to claim 5, wherein the correction part rotates a Lissajous figure, which consists of the sine wave component and the cosine wave component after the correction of the center coordinates, by $-\theta$ according to the following equation and then further corrects the Lissajous figure to make the length of the major axis coincides with the length of the minor axis, such that the first Lissajous figure approaches the second Lissajous figure $$\begin{bmatrix} I_{sin}''(x_n, y_m) \\ I_{cos}''(x_n, y_m) \end{bmatrix} = R(\theta)\begin{bmatrix} a_y/a_x & \\ & 1 \end{bmatrix}R(-\theta)\begin{bmatrix} I_{sin}'(x_n, y_m) \\ I_{cos}'(x_n, y_m) \end{bmatrix}. \quad \text{[Equation 3]}$$

7. The interference measurement system according to claim 6, wherein the geometry calculation part calculates, by using the sine wave component and the cosine wave component corrected by the correction part, a phase difference $\varphi_{nm}$ from a reference height at a position $(x_n, y_m)$ on the surface of the object to be measured corresponding to a pixel $(x_n, y_m)$ of the interference image, according to the following equation, $$\varphi_{n,m} = \tan^{-1}\frac{-I_{sin}''(x_n, y_m)}{I_{cos}''(x_n, y_m)} \quad \text{[Equation 4]}$$

and calculates, by using the phase difference $\varphi_{nm}$, the height $h_{nm}$ at the position $(x_n, y_m)$ on the surface of the object to be measured, according to the following equation, $$h_{n,m} = \frac{\lambda}{4\pi}\varphi_{n,m} \quad \text{[Equation 5]}$$

where $\lambda$ is a wavelength of the laser light.

8. An interference measurement method for measuring a shape of an object to be measured, which is executed by a computer, comprising the steps of:
  irradiating the surface of the object to be measured with laser light;
  capturing an interference image of reference light reflected at a reference surface that is movably provided on an optical axis of the laser light and measurement light reflected at the surface of the object to be measured;
  acquiring a plurality of the interference images based on a plurality of optical path lengths between the reference surface and the surface of the object to be measured from the interference measurement apparatus;
  calculating a sine wave component and a cosine wave component of an interference signal for each pixel in the plurality of the interference images, respectively;
  detecting an error between a first Lissajous figure constructed on the basis of the sine wave component and the cosine wave component for each pixel and an ideal second Lissajous figure;
  correcting the sine wave component and the cosine wave component for each pixel on the basis of the error; and
  calculating surface geometry of the object to be measured on the basis of the corrected sine wave component and cosine wave component.

\* \* \* \* \*

UNITED STATES PATENT AND TRADEMARK OFFICE
CERTIFICATE OF CORRECTION

| | | |
|---|---|---|
| PATENT NO. | : 11,536,562 B2 | Page 1 of 1 |
| APPLICATION NO. | : 17/032733 | |
| DATED | : December 27, 2022 | |
| INVENTOR(S) | : Shimpei Matsuura | |

It is certified that error appears in the above-identified patent and that said Letters Patent is hereby corrected as shown below:

On the Title Page

Item (73) Assignee:
Change "Mitutoyo Corp." to --Mitutoyo Corporation--.

Signed and Sealed this
Nineteenth Day of March, 2024

Katherine Kelly Vidal
*Director of the United States Patent and Trademark Office*